United States Patent
Piehl et al.

(10) Patent No.: US 7,170,666 B2
(45) Date of Patent: Jan. 30, 2007

(54) NANOSTRUCTURE ANTIREFLECTION SURFACES

(75) Inventors: Arthur Raymond Piehl, Corvallis, OR (US); Sriram Ramamoorthi, Corvallis, OR (US); Daniel C. Gardner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 10/898,973

(22) Filed: Jul. 27, 2004

(65) Prior Publication Data

US 2006/0024018 A1 Feb. 2, 2006

(51) Int. Cl.
*G02B 26/00* (2006.01)
*G02F 1/00* (2006.01)

(52) U.S. Cl. ...................... 359/290; 359/237
(58) Field of Classification Search ............... 385/147, 385/27, 129; 428/76, 447, 421; 359/665, 359/290–292, 237
See application file for complete search history.

(56) References Cited

U.S. PATENT DOCUMENTS

| | | | |
|---|---|---|---|
| 6,514,674 B1 | 2/2003 | Iwasaki | 430/321 |
| 6,640,034 B1 * | 10/2003 | Charlton et al. | 385/122 |
| 6,901,194 B2 * | 5/2005 | Charlton et al. | 385/122 |
| 7,020,372 B2 * | 3/2006 | Lee et al. | 385/129 |
| 2003/0102286 A1 | 6/2003 | Takahara et al. | 216/45 |

FOREIGN PATENT DOCUMENTS

| | | |
|---|---|---|
| EP | 1 418 448 A | 5/2004 |
| WO | WO 01/29148 | 4/2001 |
| WO | WO 2004/027517 A | 4/2004 |

OTHER PUBLICATIONS

M. Haupt et al., Polymer Masks on Semiconductors: A Novel Way to Nanostructures, Phys. Stat. Sol., vol. 224:3, 2001, pp. 867-870.
Hisao Kikuta et al., "Optical Elements with Subwavelength Structured Surfaces", Optical Review, 2003, pp. 63-73, vol. 10, No. 2.
Philippe Lalanne et al., "The optical properties of artificial media structured at a subwavelength scale", pp. 1-11.
Chih-Hao Chang et al., "Fabrication of sawtooth diffraction gratings using nanoimprint lithography", J. Vac. Sci. Technol. B, Nov./Dec. 2003, pp. 2755-2759, vol. 21, No. 6.
Yuzo Ono et al., "Antireflection effect in ultrahigh spatial-frequency holographic relief gratings", Applied Optics, Mar. 15, 1997, pp. 1142-1146, vol. 26, No. 6.

* cited by examiner

*Primary Examiner*—Scott J. Sugarman
*Assistant Examiner*—M Hasan

(57) ABSTRACT

An antireflection surface formed using a plurality of nanostructures of a first material on a surface of a second material. The first material is different from the second material. The distribution of spatial periods of the nanostructures is set by a self-assembly operation. The surface of the second material is converted to operate as a graded index surface that is substantially antireflective for the wavelength of interest.

25 Claims, 14 Drawing Sheets

**50A Gold Deposition
Agglomeration**

After 100W CF4 Etch – 2 Minutes

2100A Deep, Graded Index Oxide Surface

2100A Deep, Graded Index Oxide Surface

Etch #5

NANOSTRUCTURE ANTIREFLECTION SURFACES

BACKGROUND OF THE INVENTION

In various applications it is advantageous to reduce reflections from the interface formed between two materials of different indices of refraction. It is desirable to find new methods to reduce such reflections.

DETAILED DESCRIPTION OF THE PREFERRED EMBODIMENTS

Optical reflections from the interface between two materials of different indices can be greatly reduced by grading the refractive index change between the materials.

Figure 1:
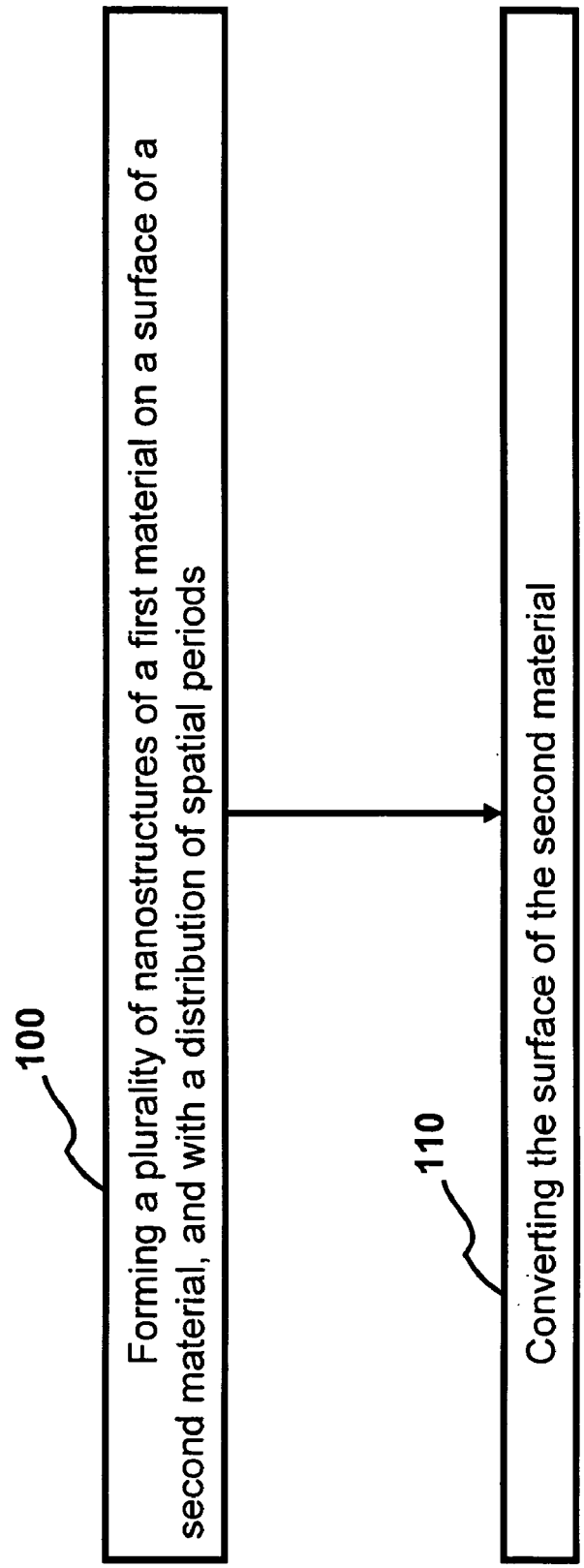
FIG. 1 is a flowchart of one embodiment of the present invention.

Referring to FIG. 1, one embodiment of a method for forming an antireflection surface is disclosed. In this embodiment, the method comprises block 100 representing the operation of forming a plurality of nanostructures of a first material on a surface of a second material, wherein the first material is different from the second material, and wherein the distribution of spatial periods of the nanostructures is set by a self-assembly operation. In one embodiment, the spatial periods of the nanostructures are substantially limited to values less than the wavelength of interest. In a further embodiment, the first material substantially defines nano-holes in the first material.

In one embodiment, the first material is chosen to have a surface tension and surface energy to promote discontinuities for selected thicknesses of the first material. For example, the first material may be gold, or a polymer such as PMMA, or may be chosen from the group of In, Sn, Ag, Bi and Pb, for example. The second material could be implemented by a variety of different materials, such as, for example, glass, silicon dioxide, or MgF2.

Figure 2:
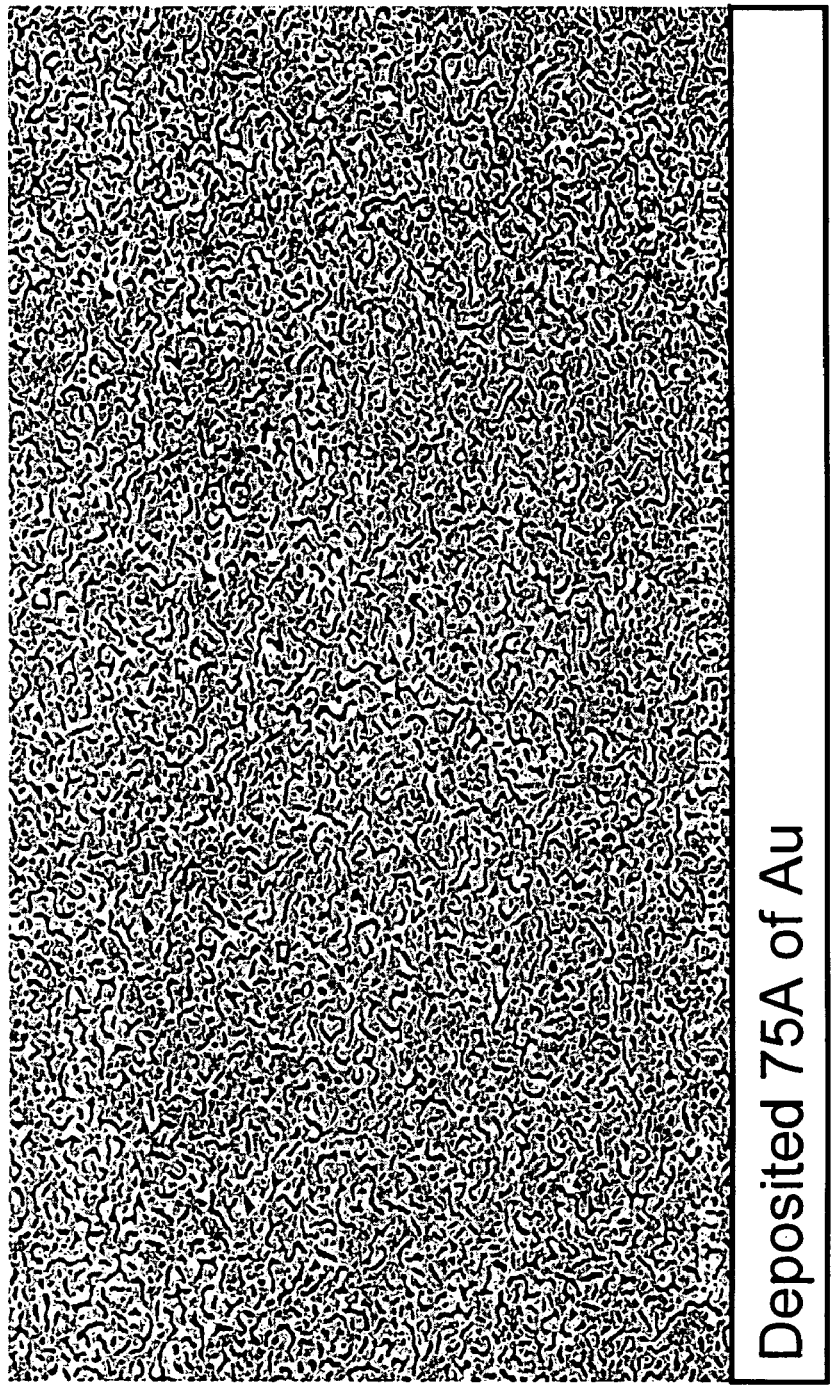
FIG. 2 is a scanning electron microscope (SEM) picture of 75 A Au deposited on a second material.
Figure 3:
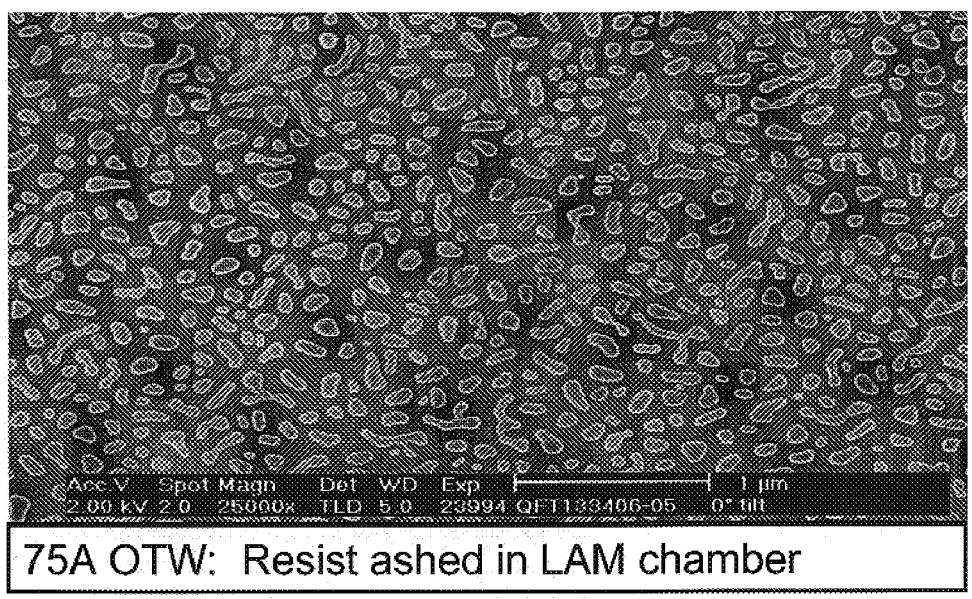
FIG. 3 is a scanning electron microscope (SEM) picture of an embodiment of 75 A Au deposited on a second material after an ash process.

The self assembly operation in the forming step may comprise, in one embodiment, providing the first material at a thickness small enough to promote discontinuities, and heating the first material to form the nanostructures. For example, a first material of gold may be deposited in a range of 50 angstroms to 75 angstroms and then heated to a temperature in the range of 275–700 deg C. for 30 min FIG. 2 is a scanning electron microscope (SEM) picture of a 75 angstrom discontinuous deposition of gold. This discontinuous layer contains a large plurality of nano-structures smaller than the wavelength of light of interest. FIG. 3 is an electron microscope picture of the 75 angstrom gold deposition agglomeration after being resist ashed in an O2 plasma chamber at a temperature of 275 deg C. In this example, Gold has agglomerated due to its high surface tension and low surface energy relative to a silicon dioxide second material.

Figure 4A:
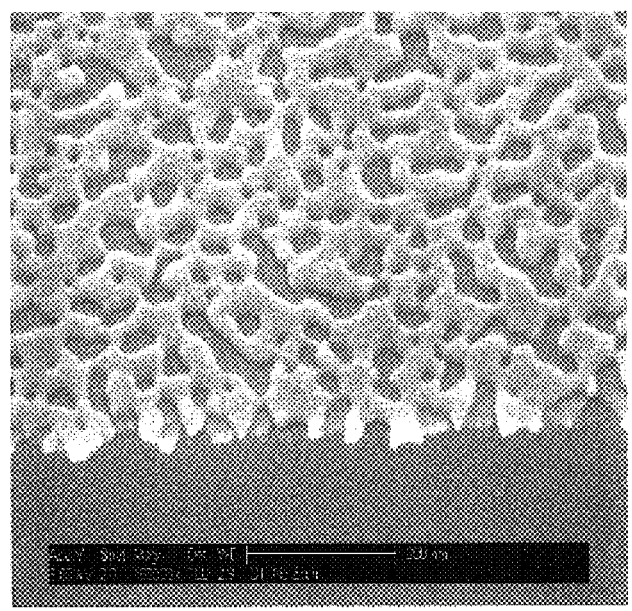
FIG. 4A is an SEM picture of 50 A Au after a 500 C heating step.

FIG. 4A is an SEM picture of a 50 angstrom discontinuous gold deposition agglomeration after heating at 500 C. It can be seen that the structure looks, in some respects, like a large plurality of nano-sized holes. In one embodiment, the forming step comprises forming the plurality of nanostructures with a distribution of lateral spacial periods between nanostructures, as compared to a substantially uniform special period.

Figure 4B:
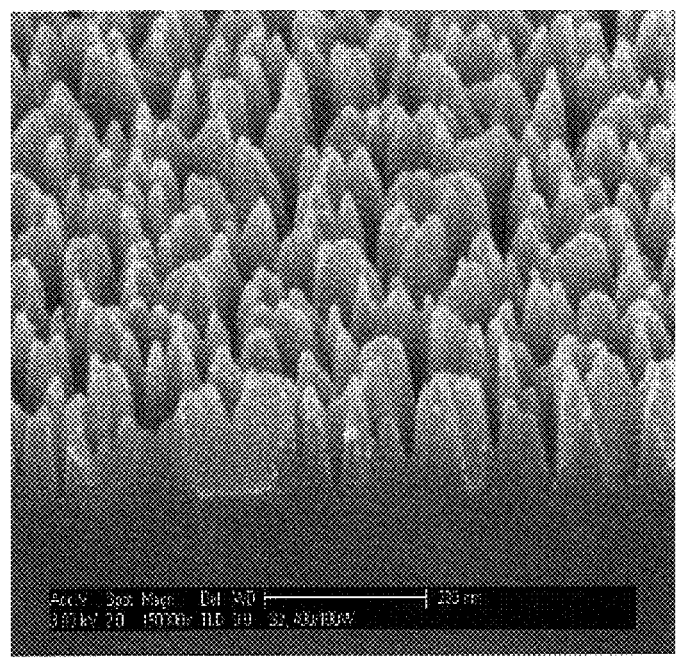
FIG. 4B is an SEM picture of an embodiment 50 A Au after a 500 C heating step and a CF4 etch.

Referring to block 110 of FIG. 1, the method further converts the surface of the second material to operate as a graded index surface that is substantially antireflective for the wavelength of interest. In one embodiment, the converting step comprises etching the first material with an etch process that etches the first material at a slower rate relative to the second material. For example, a plasma etch process may be used to perform the converting step that uses fluorine or chlorine chemistries such as C4H8/CHF3/O2. In a further embodiment, the converting step may comprise etching the first material anisotropically. An example of the surface realized from a converting step on the 50A discontinuous deposition of FIG. 4A using a 100 W CF4 plasma etch is shown in FIG. 4B. It can be seen that the result of the converting step realizes a graded index surface including a large plurality of peaks with bases that expand with depth into the substrate, and has a vertical distance over which the bases expand to at least ¼ of the wavelength of interest.

It can be seen that an initial formation of nanostructures of a first material on a second material can transfer a topography to create a high aspect ratio antireflection surface. In one embodiment, when the etch rate of the discontinuous film is lower than the etch rate of the substrate, significant topography is obtained. The discontinuous layer of nanostructures of the first material is sacrificial and can either be removed naturally, as part of the substrate etch, or by the addition of a subsequent top-layer etch. Note that the aspect ratio can be increased when the etch is anisotropic in the substrate. Etching the second material, and the first material, until the first material is completely removed, can improve the continuous nature of the effective refractive by increasing the sharpness of the etched peaks. It is also desirable to have a distribution of heights of the etched peaks to present a more gradual effective index change to the incoming radiation.

Figure 5:
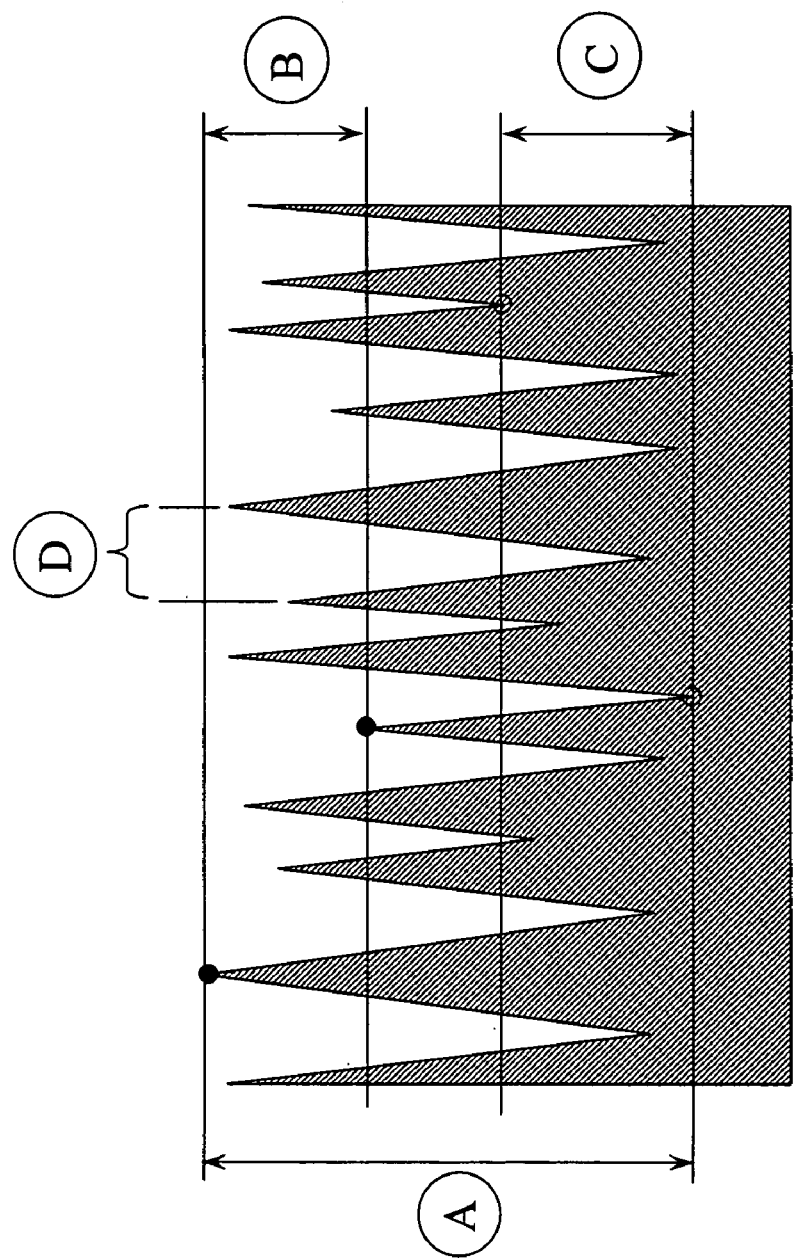
FIG. 5 is a simulated cross-section of an embodiment of a high aspect ratio topography transferred to a second material after an etch step.

FIG. 5 is a cross-section of a discontinuous layer of the first material after the converting step. The figure illustrates one embodiment of a configuration of peaks with dimension A a peak to valley range substantially greater than ¼ wavelength of interest. The figure further illustrates with dimension B a range of peak heights substantially greater than ⅛ of the wavelength of interest. The figure further illustrates with dimension C a range of valley heights substantially greater than ⅛ of the wavelength of interest. Finally, the figure further illustrates with dimension D lateral special periods substantially limited to less than the wavelength of interest. One or more of these dimensions may be implemented in embodiments disclosed herein.

Figure 12:
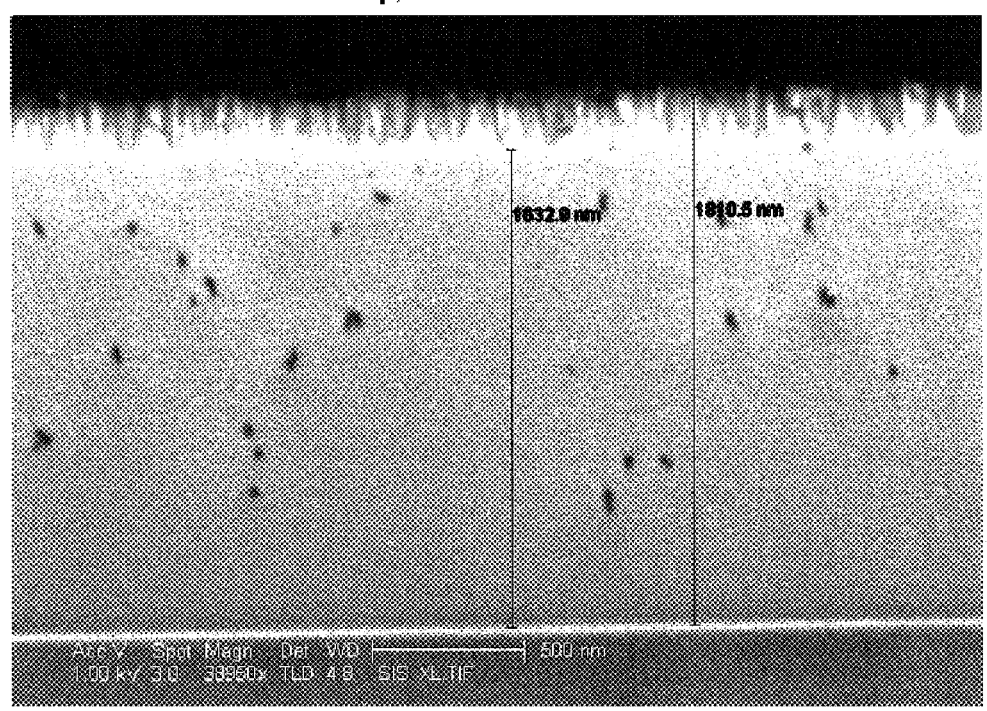
FIG. 12 is an SEM picture of an embodiment of a 2100 angstrom deep graded index oxide surface at 38950× magnification.

This is another advantage of one embodiment of the self assembled nanostructure where a distribution of 1st material spatial periods and thicknesses leads to a distribution of peak heights in the 2nd material. In the graph of FIG. 12, a distribution covering a range of depths substantially greater than $⅛^{th}$ of the wavelength of interest was realized.

Figure 6:
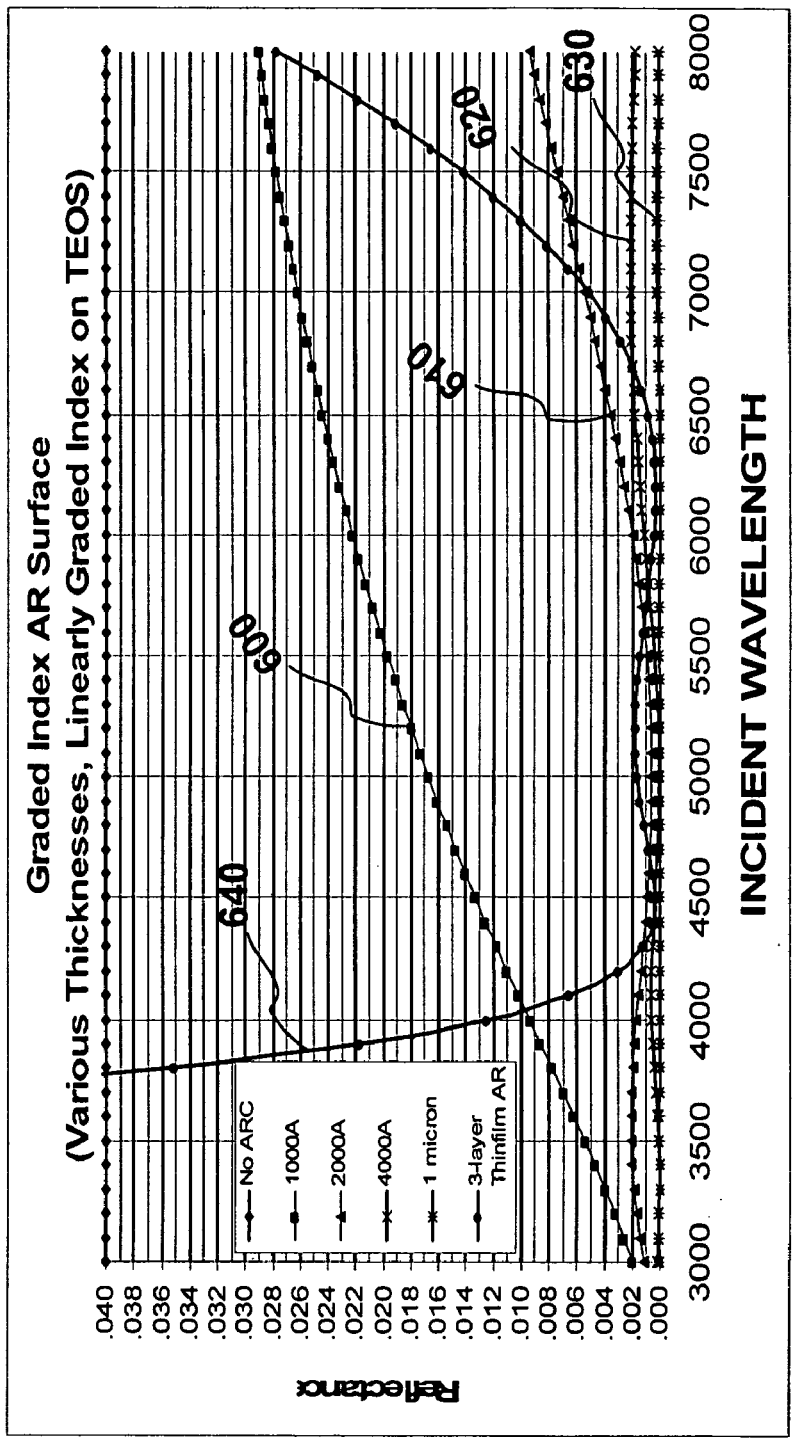
FIG. 6 is a graph of simulated reflectances vs. incident wavelength of an embodiment of an air-oxide transition for graded index depths of 1000 angstroms, 2000 angstroms, 4000 angstroms, 1 u, no grading, and a 3-layer thin film anti-reflective surface.

In some embodiments, efficient graded-index antireflection surfaces have lateral spacial periods (1/spacial frequencies) which are smaller than the wavelength of light for which reflections are to be reduced. In such embodiments, the vertical distance over which the film varies is also a significant fraction of the wavelength. FIG. 6 is a reflectance vs. incident wavelength graph that simulates the effect of a linear increase in film cross sectional area for various depths over which the linear increase occurs. The linear increase in film cross sectional area is modeled as a linear increase in the film effective index of refraction.

The abbreviation "AR" means anti-reflection coating, and "No ARC" means no anti-reflection coating. For a 1000 angstrom thickness curve 600, the reflection varies substantially linearly from about the 3000 angstrom wavelength. For a 2000 angstrom thickness curve 610, the reflection is substantially flat from about the 3000 angstrom wavelength up to about the 6000 angstrom wavelength. For a 4000 angstrom thickness curve 620, the reflection is substantially flat from at least about the 3000 angstrom wavelength. For a 1 micron thickness curve 630, the reflection is substantially flat from at least about the 3000 angstrom wavelength. The thicknesses refer to depths of the nanostructures in the top surface of the second layer after processing. The resulting surface reflectance from this method is largely independent of wavelength as long as the depth of the graded index is larger than the wavelength. This is in sharp contrast to conventional multilayer thin film antireflection coatings which have limited efficient antireflection wavelength ranges. The wavelength sensitivity for a conventional 3-layer thin-film anti-reflection stack is also shown in FIG. 6 as curve 640.

In addition to the large useful wavelength range, the graded AR surface is potentially much simpler, and less costly to produce, than multilayer thin-film coatings, which require many tightly controlled layers. The graded AR surface does not require materials other than the second material or substrate to be used. This has the advantage of not requiring films that are environmentally sensitive, or have different stresses than the substrate, or have indices that vary with wavelength in undesirable ways, or have multiple film interfaces.

For some embodiments, an advantage of graded index AR surfaces in micromachining applications, is the fact that conventional low index materials, such as MgF2 which are typically used in micromachine applications and which do not etch in fluorine or chlorine chemistries, do not have to be used. In one embodiment, a method is provided including: obtaining a first layer of material, and forming a substantially antireflective coating over a frequency band of interest using fluorine or chlorine etch chemistry. Also, the etching required for conventional multilayer thin-film stacks requires the etching of many different materials such as, for example, TiO2, Ta2O5, SiN or CaF2. Etching this many materials requires complex multi-step etches. Selected embodiments of the graded AR layers described herein can simply be etched into a single material.

Figure 7:
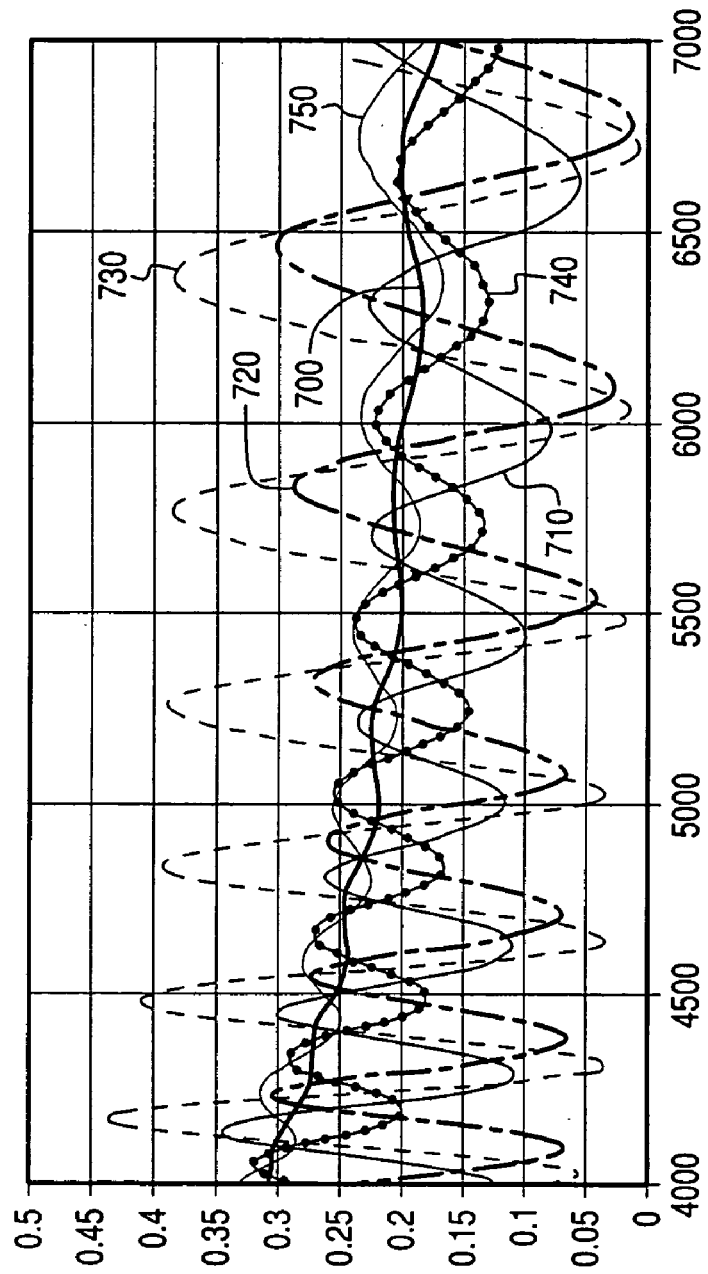
FIG. 7 is a graph of simulated reflectances vs. incident wavelength of an embodiment of oxide on silicon for linearly graded index depths of 1 u, 0.5 u, 0.25, 0.125, and no grading.

FIGS. 7–12 present various simulated and measured reflectances and SEM pictures for embodiments of the present invention. There are no units for reflectance because reflectance is the ratio of reflected intensity divided by incident intensity. The wavelength units are angstroms. Referring to FIG. 7, measured reflectances achieved vs. incident wavelength for different oxide etches are shown for 2 u oxide on silicon. The etch conditions are C4F8/CHF3/O2 4 mTorr, 500 W, 16 sccm C4F8, 5 sccm O2, for 50 W bias and 14 sccm CHF3 (curve 700), 30 W bias and 14 sccm CHF3 (curve 710), 20 W bias and 14 sccm CHF3 (curve 730), 50 W bias and 14 sccm CHF3 (curve 730), 50 W bias and 25 sccm CHF3 (curve 740), and 50 W bias and 14 sccm CHF3 (curve 750). Note that the large oscillations present for the non-graded curve are due to glass reflection/silicon reflection interference nodes. Curves 700 and 750 provide the least variation with wavelength.

Figure 8:
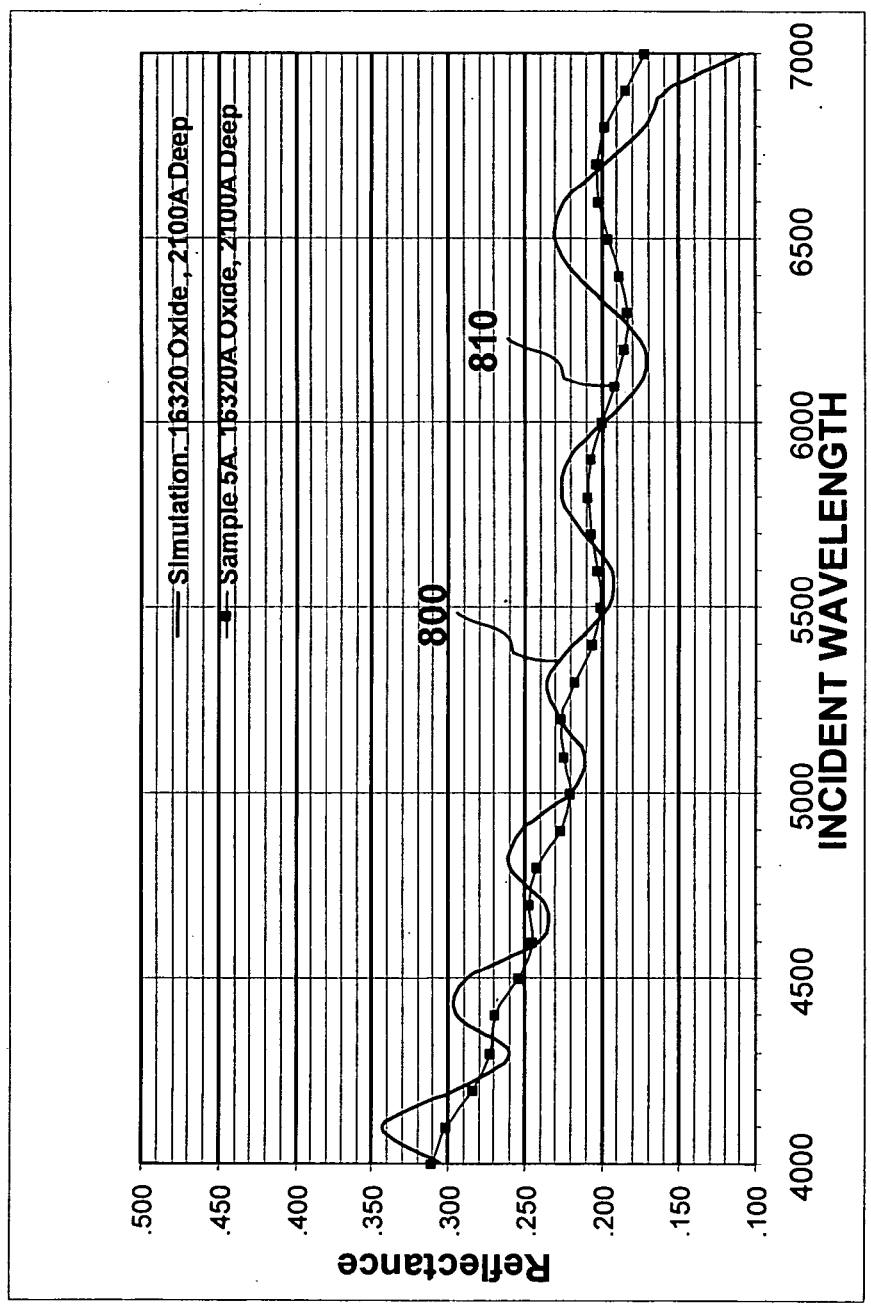
FIG. 8 is a graph of measured reflectances achieved vs. incident wavelength for different oxide etch conditions for an embodiment of 2 u oxide on silicon.

Referring to FIG. 8, a reflectance vs. incident wavelength graph is shown for a graded index surface that is 2100 angstrom deep in a 16320 angstrom oxide on silicon, i.e., two interfaces. Simulated information is shown by the curve 800, while actual measurement data is shown by the dots in the curve 810. It can be seen that the measured reflectance was better than the simulation.

Figure 9:
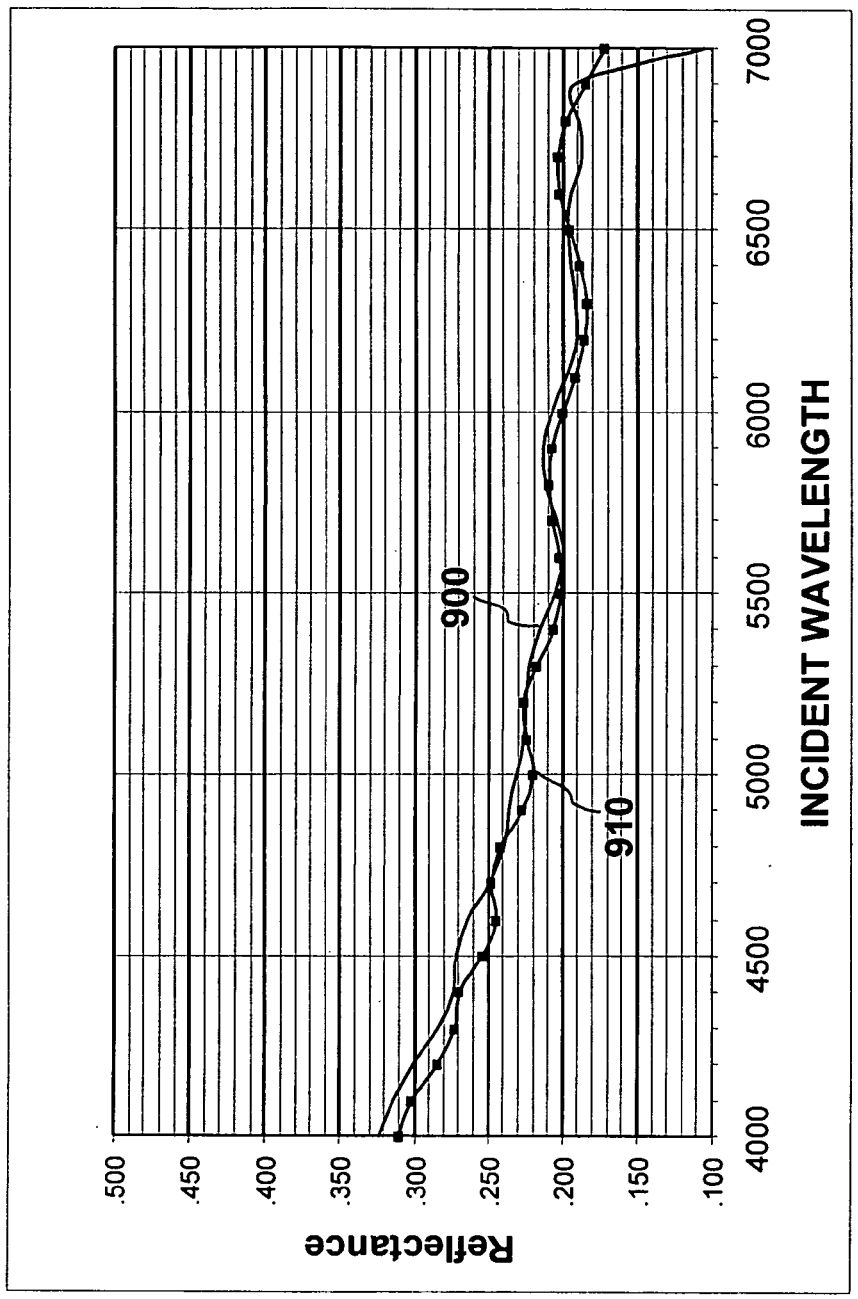
FIG. 9 is a graph of a reflectance vs. incident wavelength for an embodiment of a graded index surface that is 2100 angstrom deep in a 16320 angstrom oxide disposed on silicon (two interfaces). Simulated information is shown by the solid black line, while actual measurement data is shown by the dots.

Referring to FIG. 9, a reflectance vs. incident wavelength graph is shown for a graded index surface that is 8000 angstrom deep in a 13500 angstrom oxide. Simulated information is shown by the curve 900, while actual measurement data is shown by the dots in the curve 910.

Figure 10:
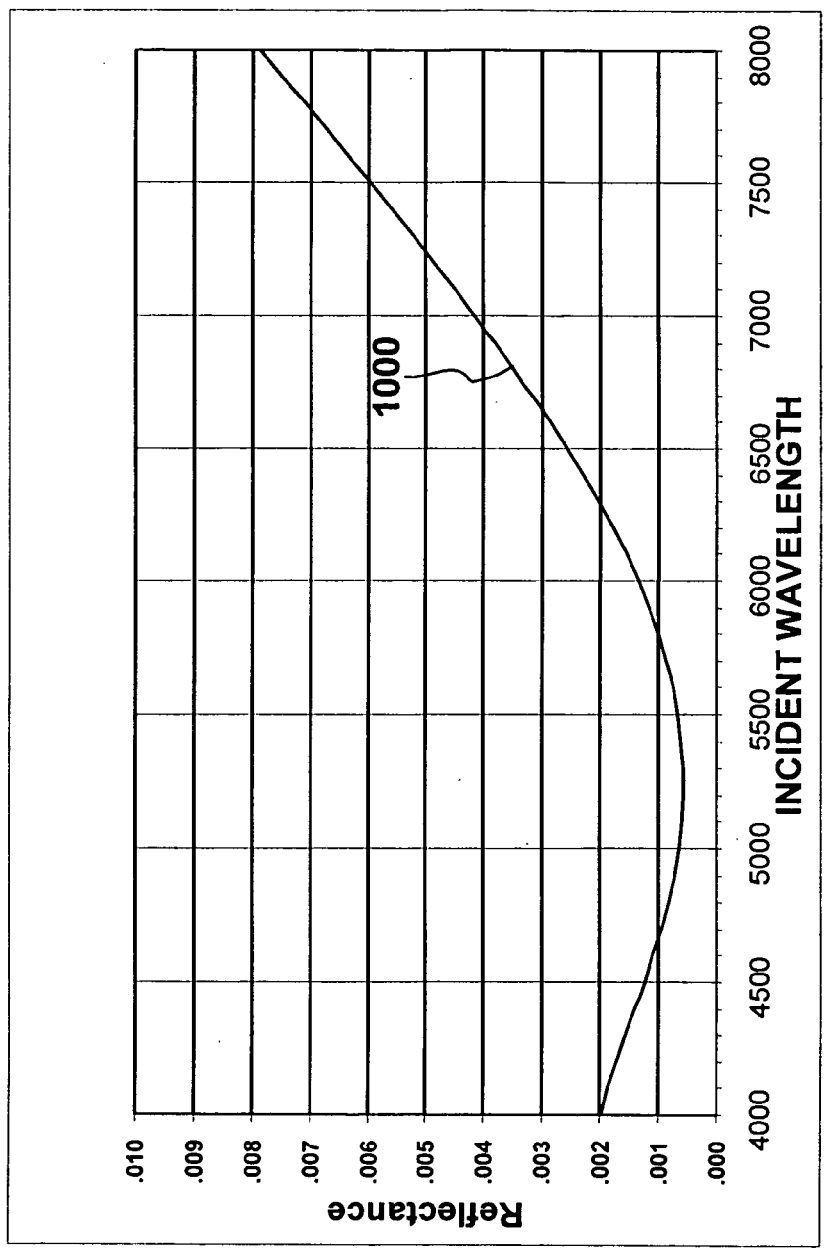
FIG. 10 is a graph of a reflectance vs. incident wavelength for an embodiment of a graded index surface that is 8000 angstrom deep in a 13500 angstrom oxide. Simulated information is shown by the solid black line,.

FIG. 10 is a graph of a simulated reflectance vs. incident wavelength for a graded index surface that is 2100 angstrom deep in a 16320 angstrom oxide with one interface, air on glass. The simulation data is shown by curve 1000. It can be seen that at 8000 angstroms, the wavelength of interest is being approached, i.e., the 2100 A depth is barely a quarter wavelength. As the wavelength of interest is approached, the reflections go up progressively.

Figure 11:
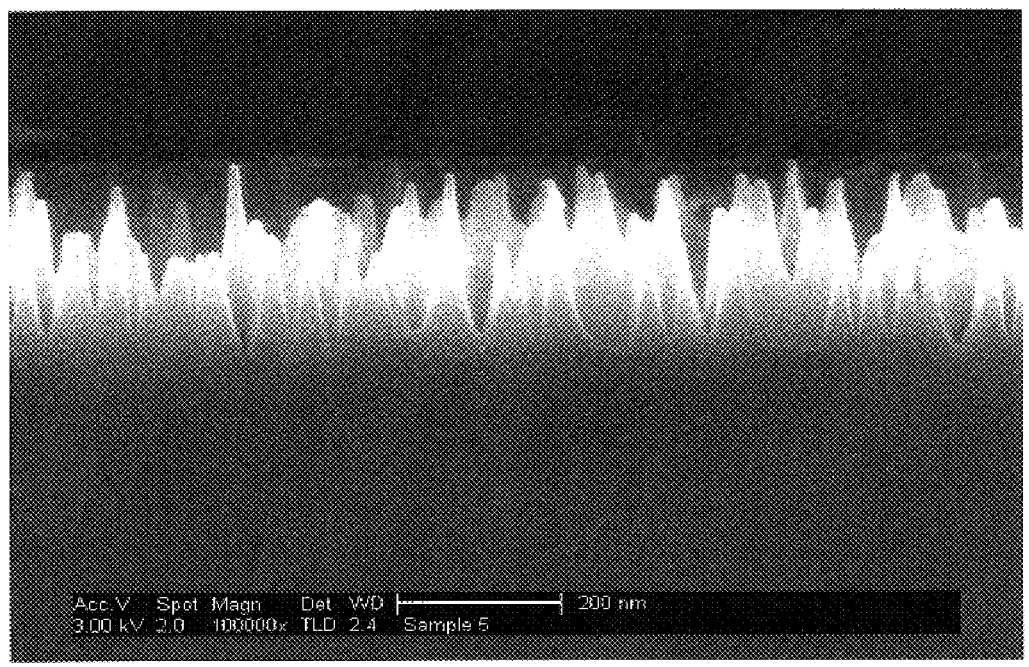
FIG. 11 is an SEM picture of an embodiment of a 2100 angstrom deep graded index oxide surface at 100,000× magnification.

FIG. 11 is an SEM picture of a 2100 angstrom deep graded index oxide surface at 100,000× magnification.

FIG. 12 is an SEM picture of a 2100 angstrom deep graded index oxide surface at 38950× magnification.

If sufficient topography cannot be obtained with the method described herein due to low etch selectivity between the discontinuous masking nanostructures of the first material and the second material, i.e., the gold has all etched away before a desired etch depth is reached, then an intermediate sacrificial layer can be inserted below the discontinuous layer. For example, such an intermediate sacrificial layer may have a larger etch selectivity relative to the second material.

In one embodiment, a layer of 500 angstroms of TaAl layer may deposited on the second material as an initial step prior to forming the plurality of nanostructures of the first material, such as gold. The deposition of the nanostructures of the gold would be performed, and then the converting step performed. Etching this structure will result in deeper nanostructure holes or other formations. Accordingly, one embodiment comprises first forming a layer of an intermediate sacrificial material on the surface of the substrate, followed by forming the plurality of nanostructures on top of the intermediate sacrificial layer, wherein the intermediate sacrificial layer is of a material that etches at a slower rate relative to the material of the substrate. The converting step would then be performed. The advantage to the use of such an intermediate sacrificial layer is that deeper vertical features may be obtained.

Some embodiments of the invention realize graded AR surfaces without requiring high resolution lithographic patterning techniques such as holographic imaging, deep UV, or e-beam lithography, or the use of specialized graded materials such as porous silicon or graded organic materials. Selected embodiments have one or more of the advantages of being less costly to manufacture, having a broad range of applications, and having substantially improved wavelength anti-reflection ranges. Such embodiments frequently also have the advantage of being easily integrated into MEMs, and conventional lens coating processing.

The discontinuous and high variability thickness films described herein can be used as etch masks for the underlying material to create high topography, graded index, antireflection layers. Such nanostructure masked graded AR surfaces are particularly useful for Optical MEMs applications requiring broadband antireflection surfaces such as optical switches, LCOS (liquid crystal on silicon), or interference based displays.

Figure 13:
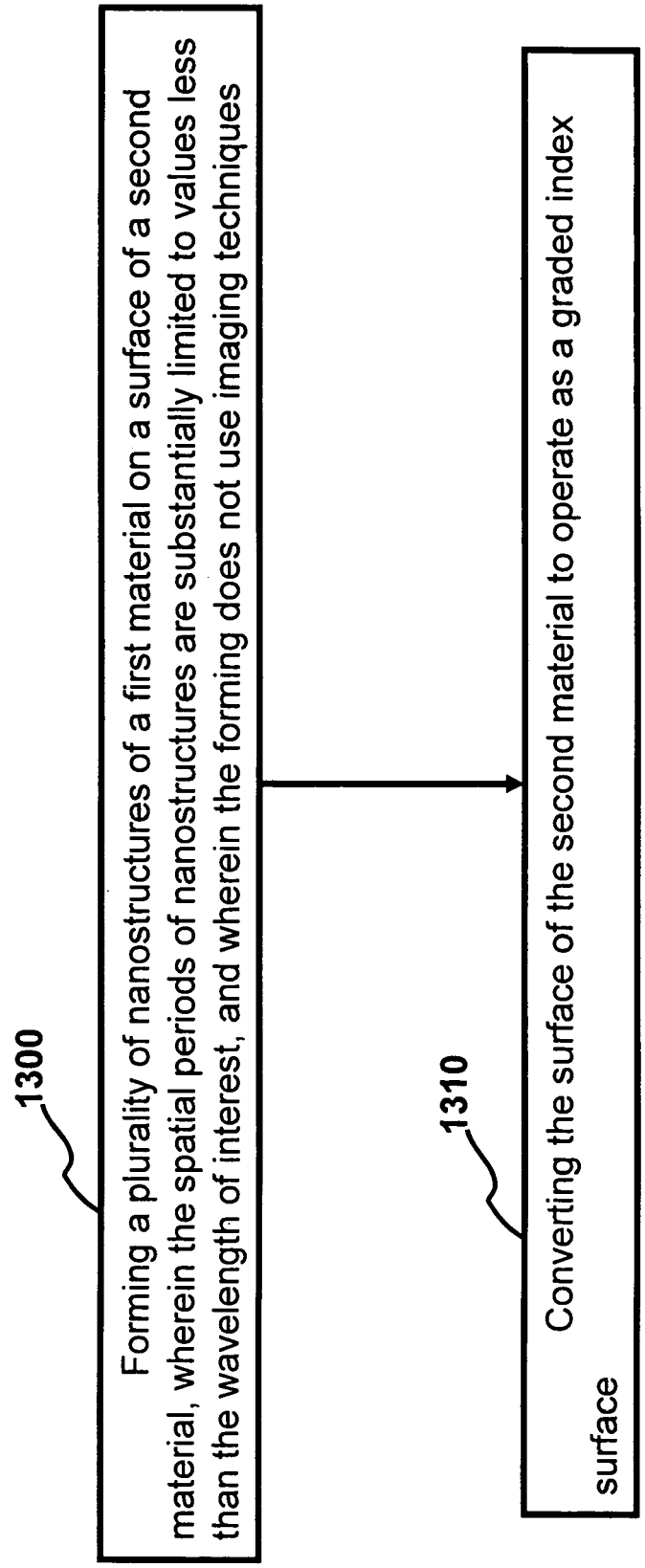
FIG. 13 is a flowchart of a further embodiment.

A further embodiment of a method for forming an antireflection surface is shown in FIG. 13. The method includes block 1300 for the operation of forming a plurality of nanostructures of a first material on a surface of a second material, wherein the first material is different from the second material, and wherein the lateral spatial periods of the nanostructures are no larger than a wavelength of interest. For example, a wavelength of interest may be 550 nm. The method further includes block 1310 for the operation of converting without using imaging techniques the surface of the second material to operate as a graded index surface that is substantially antireflective for the wavelength of interest. In one embodiment, the forming step may comprise forming the plurality of nanostructures with a non-periodic distribution of lateral spacial periods between nanostructures.

Accordingly, in one embodiment, a substantially antireflective surface may be realized including a large plurality of peaks with bases that expand with depth into material of the surface, where a non-periodic distribution of lateral spacial periods are substantially limited to values less than the wavelength of interest and a peak to valley range is substantially greater than ¼th of the wavelength of interest. The embodiment may further include a variation of peak heights occurring with a range substantially greater than ⅛th of the wavelength of interest. This distribution range of peak heights can be seen, for example, in FIG. 12 and the dimensions referred to above can be seen in FIG. 5 as dimensions A and B.

In a further embodiment, a substantially antireflective surface is realized including a large plurality of peaks with bases that expand with depth into material of the surface, wherein a distribution of lateral spacial periods are substantially limited to values less than the wavelength of interest and a vertical distance over which the bases expand is at least ¼th of the wavelength of interest. The embodiment may further include valley heights having a range substantially greater than ⅛th of the wavelength of interest. This distribution range of valley depths can be seen, for example, in FIG. 11 also, and the dimensions referred to can be seen in FIG. 5 as dimensions A and C.

In one embodiment, a device may be realized such as a display device with a substantially antireflective surface for at least a frequency of interest, that comprises, the device, and a graded index surface on the device including a large plurality of peaks with bases that expand with depth into the substrate, wherein a non-periodic distribution of lateral spacial periods are substantially limited to values less than the wavelength of interest and a vertical distance over which the bases expand is at least ¼th of the wavelength of interest In one embodiment, the display device may be a MEMS special light modulator.

In a further embodiment a light transmission device may include mechanism for transmitting light, the mechanism for transmitting having a surface. Such a mechanism may be implemented, for example, by a lens. The light transmission device may further include a mechanism for preventing substantial reflection from the surface using non-uniformly spaced nanostructures. The mechanism for preventing substantial reflection may be implemented by a graded index surface of nanostructures.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A method for forming an antireflection surface, comprising:
   forming a plurality of nanostructures of a first material on a surface of a second material, wherein the first material is different from the second material, and wherein the distribution of spatial periods of the nanostructures is set without lithographic patterning techniques; and
   converting the surface of the second material to operate as a graded index surface that is substantially antireflective for the wavelength of interest.

2. The method as defined in claim 1 wherein the spatial periods of the nanostructures are substantially limited to values less than the wavelength of interest.

3. The method as defined in claim 1, wherein the converting step comprises etching the first material with an etch process that etches the first material at a slower rate relative to the second material.

4. The method as defined in claim 1, wherein the converting step comprises etching the second material anisotropically.

5. The method as defined in claim 1, wherein the converting step comprises etching the second material and the first material substantially simultaneously, and continuing the etch past a point where the first material is completely removed.

6. The method as defined in claim 1, wherein the first material has a surface tension and surface energy to promote nanostructures for selected thicknesses of the first material.

7. The method as defined in claim 1, wherein the first material is gold.

8. The method as defined in claim 1, wherein the first material is a polymer.

9. The method as defined in claim 1, wherein the first material is one from the group of In, Sn, Ag, Bi and Pb.

10. The method as defined in claim 1, wherein the forming step comprises
    providing the first material at a thickness small enough to promote discontinuities; and
    heating the first material to form the nanostructures.

11. The method as defined in claim 1, wherein the forming step uses fluorine or chlorine etch chemistry.

12. The method as defined in claim 1, where the wavelength of interest is 550 nm.

13. The method of claim 1 where the second material contains SiO2.

14. A method for forming an antireflection surface, comprising:
    forming a plurality of nanostructures of a first material on a surface of a second material, wherein the first material is different from the second material, and wherein the distribution of spatial periods of the nanostructures is set by a self-assembly operation; and
    converting the surface of the second material to operate as a graded index surface that is substantially antireflective for the wavelength of interest wherein the graded index surface comprises a large plurality of peaks with bases that expand with depth into the second material and a vertical distance over which at least some of the bases expand is at least ¼th of the wavelength of interest.

15. A method for forming an antireflection surface, comprising:
    forming a plurality of nanostructures of a first material on a surface of a second material, wherein the first material is different from the second material, by first forming a layer of an intermediate sacrificial material on the surface of the second material, followed by forming the plurality of nanostructures on top of the intermediate sacrificial layer and wherein the distribution of spatial periods of the nanostructures is set by a self-assembly operation; and
    converting the surface of the second material to operate as a graded index surface that is substantially antireflective for the wavelength of interest, wherein the intermediate sacrificial layer is etched at a higher rate relative to the second material.

16. A method, comprising:
    obtaining a first layer of material that has agglomerated to contain a large plurality of nano-structures using a self assembly operation without imaging techniques; and
    forming a substantially antireflective coating over a frequency band of interest in a second layer of material using fluorine or chlorine etch chemistry in the first layer of material to transfer the topography of the first layer of material to the second layer of material.

17. A device with a substantially antireflective surface for at least a frequency of interest, comprising:
    a device; and
    a graded index surface on the device comprising a large plurality of peaks with bases that expand with depth into material of the surface, wherein a non-periodic distribution of lateral spatial periods are substantially limited to values less than the wavelength of interest and a peak to valley range is substantially greater than ¼th of the wavelength of interest.

18. A display device with a substantially antireflective surface for at least a frequency of interest, comprising:
    a display device; and
    a graded index surface on the device comprising a large plurality of peaks with bases that expand with depth into a material of the surface, wherein a non-periodic distribution of lateral spatial periods are substantially limited to values less than the wavelength of interest and a peak to valley range is substantially greater than ¼th of the wavelength of interest.

19. The display device as defined in claim 18, wherein the display device is a MEMS spatial light modulator.

20. The method as defined in claim 18, wherein the forming step comprises forming the plurality of nanostructures with a non-periodic distribution of lateral spatial periods between nanostructures.

21. A method for forming an antireflection surface, comprising:
    forming a plurality of nanostructures of a first material on a surface of a second material, wherein the first material is different from the second material, and wherein the spatial periods of the nanostructures are substantially limited to values less than the wavelength of interest, and wherein the forming does not use imaging techniques; and wherein the forming does not use imprinting; and
    converting the surface of the second material to operate as a graded index surface that is substantially antireflective for the wavelength of interest.

22. The method as defined in claim 21, wherein the forming step comprises
    providing the first material at a thickness small enough to promote nanostructures; and
    heating the first material to form the nanostructures.

23. A substantially antireflective surface comprising a large plurality of peaks with bases that expand with depth into material of the surface, where a non-periodic distribution of lateral spatial periods are substantially limited to values less than the wavelength of interest and a peak to valley range is substantially greater than ¼th of the wavelength of interest; and
    wherein a variation of peak heights occur with a range substantially greater than ⅛th of the wavelength of interest.

24. A substantially antirellective surface comprising a large plurality of peaks with bases that expand with depth into material of the surface,
    wherein a distribution of lateral spatial periods are substantially limited to values less than the wavelength of interest and a vertical distance over which the bases expand is at least ¼th of the wavelength of interest; and
    wherein the valley heights have a range substantially greater than ⅛th of the wavelength of interest.

25. A method for forming an antireflection surface, comprising:
    forming a plurality of nanostructures of a first material on a surface of a second material, wherein the first material is different from the second material, and wherein the distribution of spatial periods of the nanostructures is set by agglomeration due to the first material having a high surface tension and low surface energy relative to the second material; and
    converting the surface of the second material to operate as a graded index surface that is substantially antireflective for the wavelength of interest.

* * * * *